(12) United States Patent
McGreevy

(10) Patent No.: US 12,017,776 B2
(45) Date of Patent: Jun. 25, 2024

(54) PASSENGER SEATING

(71) Applicant: Thompson Aero Seating Limited, Craigavon (GB)

(72) Inventor: Jonathan McGreevy, Camlough (GB)

(73) Assignee: Thompson Aero Seating Limited, Portadown (GB)

( * ) Notice: Subject to any disclaimer, the term of this patent is extended or adjusted under 35 U.S.C. 154(b) by 0 days.

(21) Appl. No.: 17/369,415

(22) Filed: Jul. 7, 2021

(65) Prior Publication Data

US 2022/0009637 A1 Jan. 13, 2022

(30) Foreign Application Priority Data

Jul. 10, 2020 (GB) ..................................... 2010707

(51) Int. Cl.
*B64D 11/06* (2006.01)

(52) U.S. Cl.
CPC ........ *B64D 11/0601* (2014.12); *B64D 11/064* (2014.12); *B64D 11/0643* (2014.12)

(58) Field of Classification Search
CPC .............. B64D 11/0601; B64D 11/064; B64D 11/0643
See application file for complete search history.

(56) References Cited

U.S. PATENT DOCUMENTS

| 3,541,742 | A | 11/1970 | Harper |
| 2015/0166182 | A1 | 6/2015 | Ducreux et al. |
| 2017/0081030 | A1 | 3/2017 | Clucas et al. |
| 2017/0259921 | A1 | 9/2017 | Valdes De La Garza et al. |

FOREIGN PATENT DOCUMENTS

| EP | 0980826 | 2/2000 |
| EP | 3549865 | 9/2019 |
| EP | 3549865 | 10/2019 |
| EP | 3653506 | 5/2020 |
| GB | 733081 | 7/1955 |
| GB | 2438162 | 11/2007 |

OTHER PUBLICATIONS

UK Search Report of corresponding Application No. GB2010707.4, dated May 24, 2021.

*Primary Examiner* — Anthony D Barfield
(74) *Attorney, Agent, or Firm* — Gardner, Linn, Burkhart & Ondersma LLP

(57) ABSTRACT

A seating arrangement for a passenger-carrying vehicle including a first seat and a third seat arranged in a first row and facing in a forward direction, and a second seat located rearwardly of the first and third seats. The third seat is offset forwardly with respect to the first seat, the second seat is offset with respect to each of the first and third seats in a transverse direction that is perpendicular to the forward direction such that it is located between the first and third seats in the transverse direction. The combined effect of the transverse offset of the seats in adjacent rows, together with the forward offset of the seats in any given row provides seated passengers with a larger passenger accommodation region than is provided by conventional seating arrangements.

16 Claims, 5 Drawing Sheets

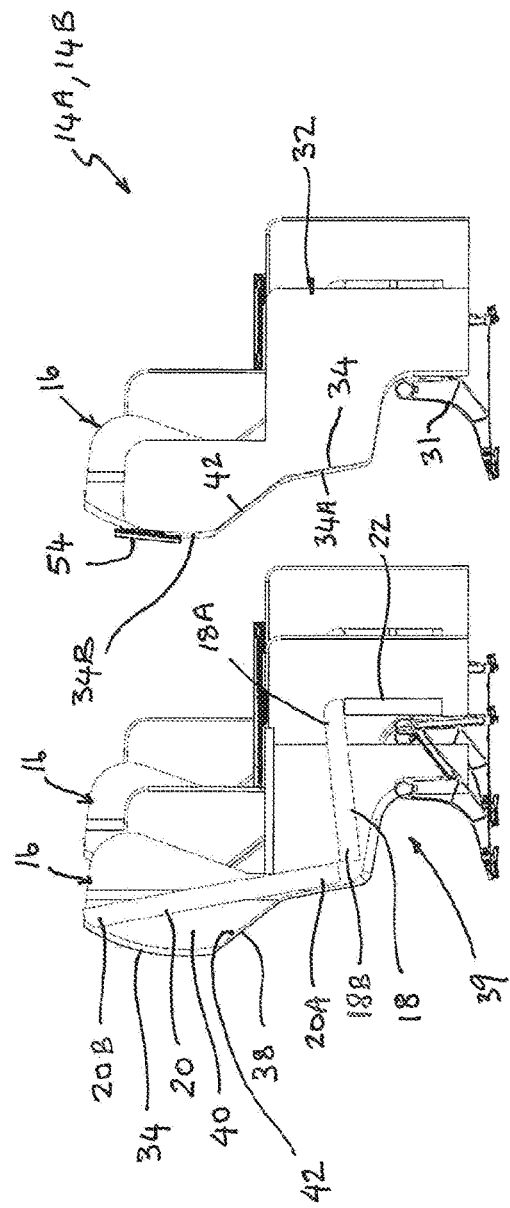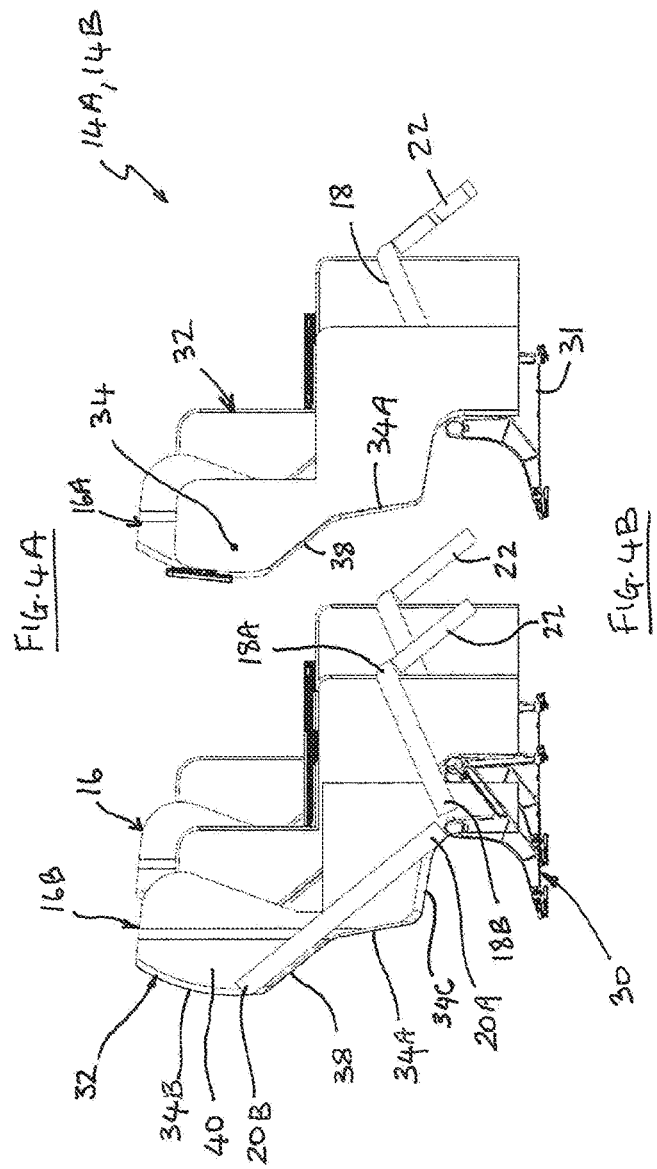

PASSENGER SEATING

FIELD OF THE INVENTION

The invention relates to seats and seating arrangements. The invention relates particularly to seats and seating arrangements for aircraft or other passenger-carrying vehicles.

BACKGROUND TO THE INVENTION

It is economically desirable for aircraft operators to maximize the number of passenger-carrying seats on an aircraft. However, densely packed seats, for example as may be found in typical economy class cabins, tend to provide relatively poor comfort for passengers. Business class and first class seats, especially those that can recline into a bed, have a larger footprint than economy class seats and so provide better comfort for passengers. However, they make inefficient use of the space within a cabin and are therefore relatively expensive for passengers.

SUMMARY OF THE INVENTION

The present invention provides passenger seating that has improved comfort compared to conventional economy class seating but which makes relatively efficient use of the space within the cabin.

A first aspect the invention provides a seating arrangement for a passenger-carrying vehicle, the seating arrangement includes a first seat and a third seat arranged in a first row and facing in a forward direction; and a second seat located rearward of the first and third seats. The third seat is offset forwardly with respect to the first seat, and wherein the second seat is offset with respect to each of first and third seats in a transverse direction that is perpendicular to the forward direction such that it is located between the first and third seats in the transverse direction. The first and third seats are typically adjacent or neighbouring each other in the first row.

In illustrated embodiments, the second and third seats are, with respect to each other, overlapping in the transverse direction, and wherein, optionally, the seat pan of the second seat is offset but overlapping with the seat pan of the third seat in the transverse direction and/or the back rest of the third seat is offset but overlapping with a leg rest of the second seat in the transverse direction.

In illustrated embodiments, the first and second seats are, with respect to each other, overlapping in a transverse direction that is perpendicular to the forward direction, and wherein, optionally, the seat pan of the first seat is offset but overlapping with the seat pan of the second seat in the transverse direction and/or the back rest of the first seat is offset but overlapping with a leg rest of the second seat in the transverse direction.

The first seat and the third seat may overlap with each other in the forward direction.

In the illustrated embodiments the first seat and the second seat do not overlap in the forward direction at least when the first and second seats are in the upright state, and preferably also when either or both of the seats are in a reclined state.

Typically, the seats are arranged in a plurality of rows, each row comprising at least one seat, and wherein the first and third seats are located in a row that is in front of a row in which the second seat is located. Each row may comprise a plurality of seats, and wherein the respective seats of each row are arranged so that the row is obliquely disposed with respect to the forward direction, each seat in a row typically being offset but overlapping with the or each adjacent seat in the row in the forward direction. Typically the rows run parallel with one another.

The seating arrangement typically includes a plurality of instances of the first, second and third seats, wherein any row that is in front of another row has at least one of the first and third seats, and the another row has a corresponding second seat.

The first and second seats may be spaced apart in the forward direction by a pitch that allows part of at least one leg of a passenger in the second seat to fit below an overhang at the rear of the first seat, in particular when the second seat is in a reclined state.

The transverse overlap between the first and second seats may be such that only one leg of the passenger fits below the overhang.

A second aspect the invention provides a passenger-carrying vehicle, such as an aircraft, comprising a seating arrangement embodying the first aspect of the invention. The forward direction may be obliquely disposed to a longitudinal direction of the vehicle. The forward direction may be oriented towards or away from an outer boundary of the vehicle. First and second instances of the seating arrangement may be located on opposite sides of an aisle, and wherein the respective forward direction of each of the first and second instance extends obliquely away from or obliquely towards the aisle.

A third aspect the invention provides a seat for a passenger-carrying vehicle, the seat comprising a seat pan and a back rest, and being operable between an upright state and a reclined state, wherein in the reclined state the seat pan is in a position that is forward with respect to a position of the seat pan in the upright state, and a rear portion of the seat pan is at a level that is lower than a level of the rear portion in the upright state. The seat of the third aspect of the invention is advantageously used in the seating arrangement of the first aspect of the invention.

In the reclined state a front portion of the seat pan may be at a level that is the same or substantially the same as a level of the front portion in the upright state.

In the reclined state the seat pan may be more steeply disposed with respect to horizontal than it is when the seat is in the upright state.

In the reclined state the back rest may be in a position that is lower with respect to a position of the back rest in the upright state.

In the reclined state a bottom portion of the back rest may be at a level that is lower than a level of the bottom portion in the upright state.

In the reclined state a top portion of the back rest may be in a position that is rearward with respect to a position of the top portion in the upright state.

In the reclined state a bottom portion of the back rest may be in a position that is forward with respect to a position of the bottom portion in the upright state.

In the reclined state the back rest may be more shallowly disposed with respect to horizontal than it is when the seat is in the upright state.

Optionally, the seat includes a leg rest and wherein, in the reclined state the leg rest less steeply inclined with respect to horizontal than it is the upright state.

In the reclined state the seat pan and the back rest may be obliquely disposed with respect to each other and the leg rest may be parallel, or substantially parallel disposed with respect to the back rest.

The seat may include a base structure and means for articulating at least the seat pan with respect to the base structure to enable movement of the seat between the upright and reclined states, wherein the articulating means may comprise one or more coupling mechanism, linkage and/or other mechanism configured to allow at least the seat pan to move with respect to the base structure between the upright and reclined states. The articulating means typically includes means for articulating the back rest and/or a leg rest with respect to the base structure.

The seat may include means for articulating the back rest with respect to the seat pan and/or means for articulating a leg rest with respect to the seat pan, wherein the articulating means may comprise one or more coupling mechanism, linkage and/or other mechanism configured to allow the back rest or the leg rest to move with respect to the seat pan between the upright and reclined states.

The seat may be provided in a shell structure, the shell structure having a back portion located behind the respective back rest, the back rest being movable with respect to the back portion, and wherein the back portion includes an upper back portion above a lower back portion, the upper back portion projecting rearward of the lower back portion so that a rear surface of the back portion is shaped to define an overhang.

Optionally, the upper back portion is shaped to define a recess for receiving the top portion of the back rest when the seat is in the reclined state, the recess projecting rearward of the lower back portion to provide the overhang. The recess may include a portion for seating the top portion of the back rest when the seat is in the reclined state, the seating portion forming the overhang.

The shell structure may carry a rearward facing electronic display device, the display device extending laterally from the shell structure in a transverse direction when deployed.

Although embodiments of the invention are described with respect to application to aircraft, it is not limited to such applications. It may, for example, find application in other forms of transport such as ships, hydrofoils, trains and coaches and so forth, as well as in other circumstances not related to transport.

Further advantageous aspects of the invention will become apparent to those ordinarily skilled in the art upon review of the following description of a specific embodiment and with reference to the accompanying drawings. Although specific embodiments of the invention are described with respect to application to aircraft, the invention is not limited to such applications. It may, for example, find application in other vehicles such as ships, hydrofoils, trains and coaches and so forth, as well as in other circumstances not related to transport.

BRIEF DESCRIPTION OF THE DRAWINGS

An embodiment of the invention is now described by way of example and with reference to the accompanying drawings in which:

FIG. 4A is a side view of the two rows of FIG. 3 with the seats in an upright state;

FIG. 4B is a side view of the two rows of FIG. 3 with the seats in a reclined state.

DETAILED DESCRIPTION OF THE DRAWINGS

Figure 1:
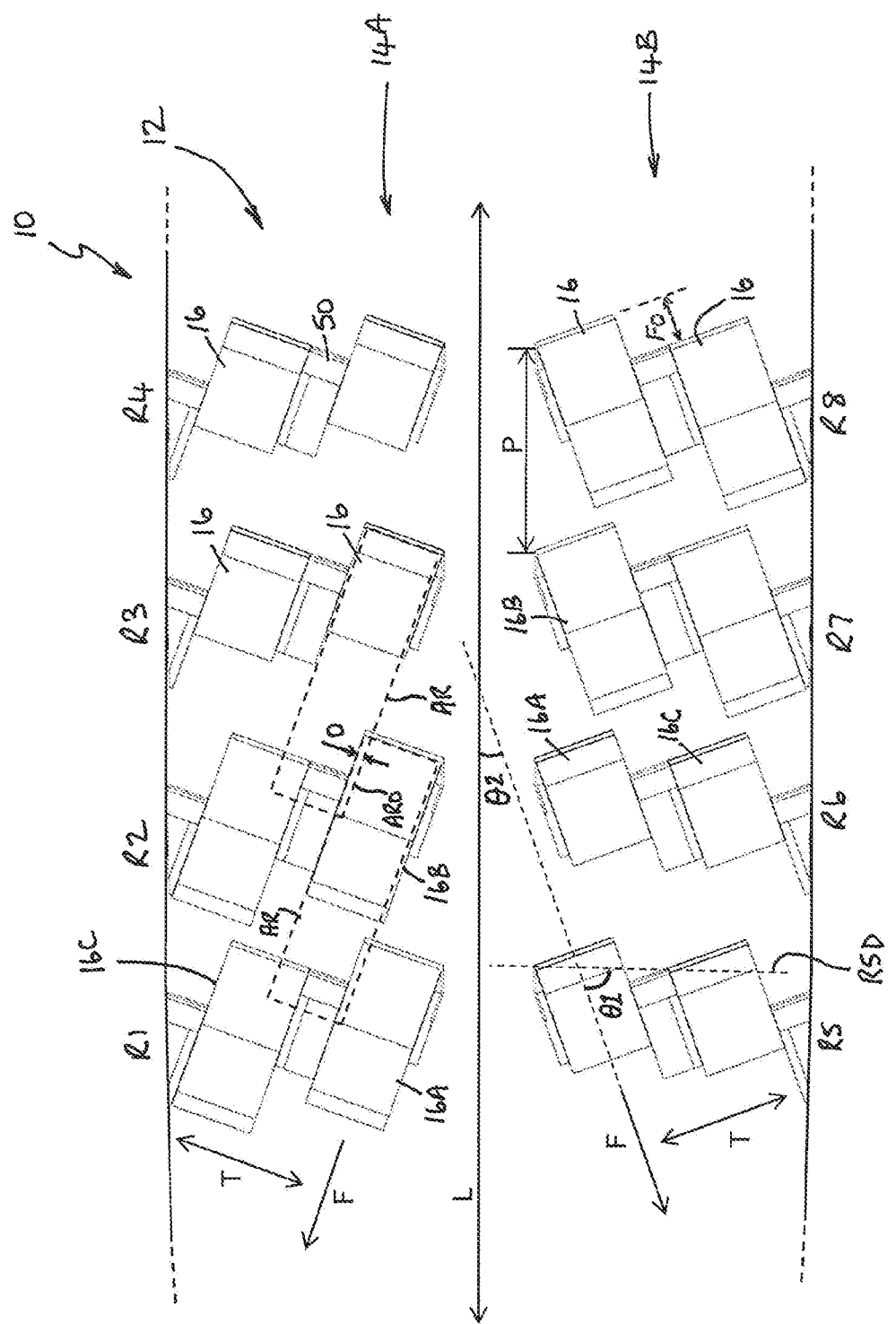
FIG. 1 is a plan view of an aircraft cabin including a seating arrangement embodying one aspect of the invention, the seating arrangement comprising seats embodying another aspect of the invention.
Figure 2:
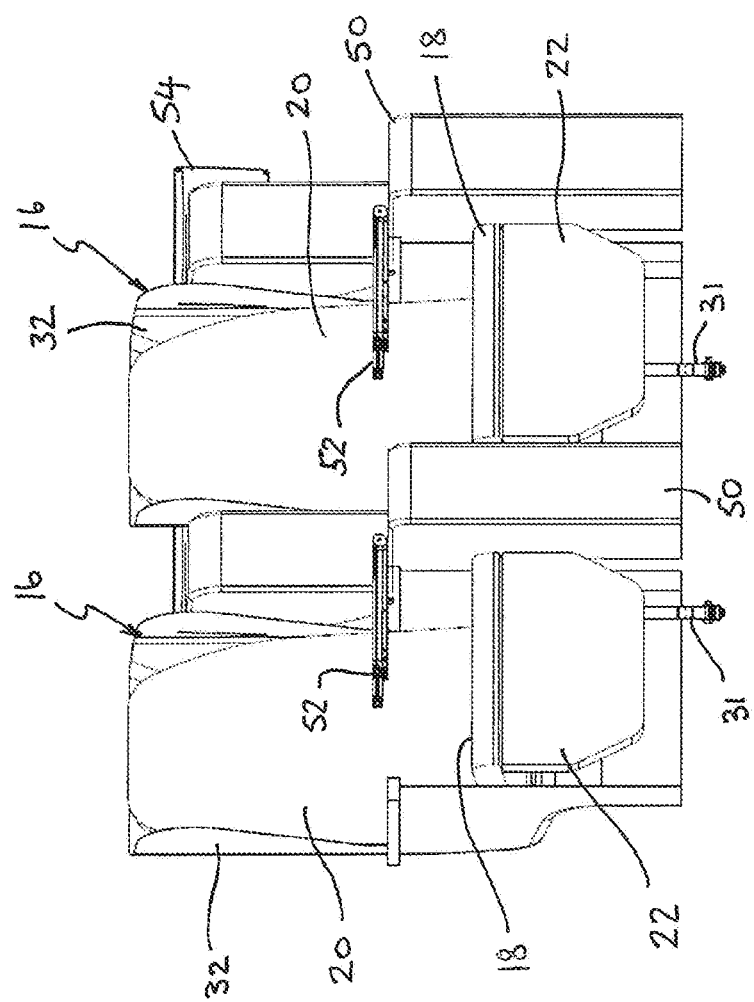
FIG. 2 is a front perspective view of two of the seats of FIG. 1 in a row.
Figure 3:
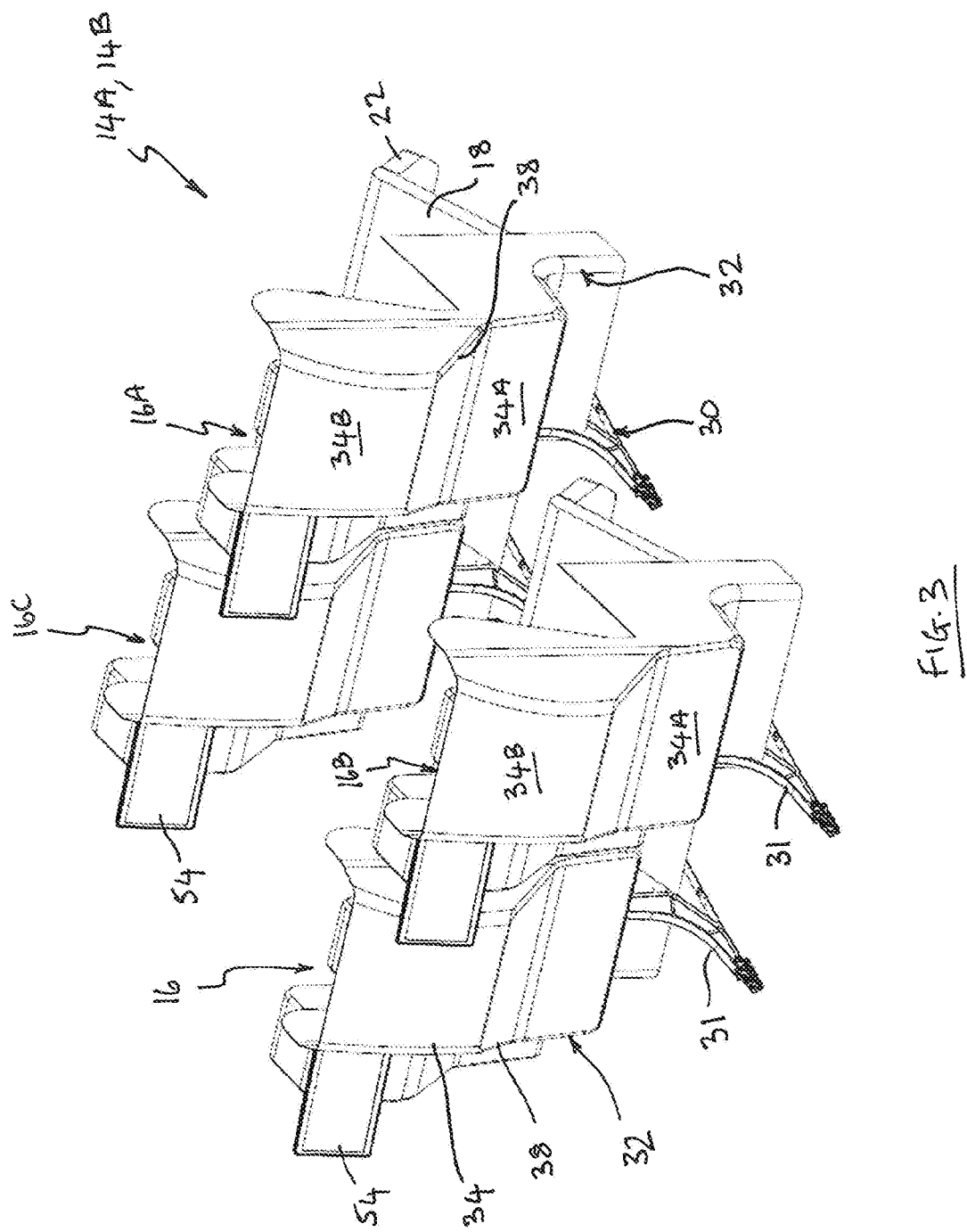
FIG. 3 is a rear perspective view of two rows of two of the seats of FIG. 1.

Referring now in particular to FIG. 1 of the drawings there is shown, generally indicated as 10, a fuselage of an aircraft, the fuselage 10 containing a passenger cabin 12. For reasons of clarity only part of the fuselage 10 and cabin 12 are shown. Passenger seating arrangements 14A, 14B embodying one aspect of the invention are provided in the cabin 12, each seating arrangement 14A, 14B comprising a plurality of seats 16 embodying another aspect of the invention. FIG. 1 shows a preferred embodiment in which there are two instances 14A, 14B of the seating arrangement, separated by an aisle 15. In alternative embodiments (not illustrated) there may be only one instance of the passenger seating, or there may be more than two instances, and there may be more than one aisle, either of which may depend on the size and/or desired configuration of the aircraft. The cabin 12 has a longitudinal, or fore-and-aft, direction L, and the, or each, aisle typically runs in the longitudinal direction L.

Within each seating arrangement 14A, 14B, the seats 16 are arranged in a plurality of rows R1-R4 and R5-R8, which are preferably parallel with each other. In preferred embodiments each row comprises more than one seat 16, although more generally each row may comprise one or more seat 16. FIG. 1 shows a typical embodiment in which each row comprises (only) two seats 16.

Each seat 16 faces in a forward direction F, the forward direction therefore also being the direction in which a passenger (not shown) faces when seated. In the following description, terms such as "forward", "front" or "in front of" are intended to refer to the forward direction F, while terms such as "rearward", "rear" or "behind" are intended to refer to a rearward direction that is opposite the forward direction F. It is noted that the forward direction F is not necessarily forward in the sense that it is in, or generally in, the direction of travel of the aircraft or towards the front of the aircraft. Instead the forward direction F is the direction in which a seated passenger faces, and may extend forwardly or rearward with respect to the aircraft.

In illustrated embodiments, within each seating arrangement 14A, 14B, each seat 16 faces in the same forward direction. Optionally, each row is oriented such that it is perpendicular to the forward direction F. However, in illustrated embodiments, each row is disposed obliquely with respect to the forward direction F. It is preferred that each seat 16 in a given row is offset but preferably overlapping with the or each adjacent seat in the same row in the forward direction F. As a result, each seat 16 of any given row is staggered with respect to the, or each, adjacent seat 16 in the same row in the forward direction F, preferably by the same distance. For example, in typical embodiments, the offset in the forward direction F between adjacent seats in any given row (denoted as FO in row R8 of FIG. 1) may be in the range 5-15 inches (or 127 mm to 381 mm), although it may alternatively be smaller or greater depending on the requirements of the embodiment. In preferred embodiments, the offset, or stagger, between adjacent seats 16 in the row is in the same sense (i.e. either forwards or rearwards) along to the row, as a result of which the row is obliquely disposed with respect to the forward direction F. This is illustrated in FIG. 1 wherein the direction of row R5 is illustrated by axis R5D which makes an acute angle θ1 with the forward direction F. By way of example, angle θ1 may be between 66° and 73° (inclusive), although smaller or larger angles may be implemented depending on the requirements of the application. In alternative embodiments (not illustrated), the sense of the offset of adjacent seats may alternate (i.e. alternate between forwards and rearwards) along the row. In any event, the offset or staggering of seats 16 in this manner creates more space in the forward direction F for the passenger than would be the case if the seats in each row were in register with each other in the forward direction F. This larger space is illustrated in FIG. 1 by the passenger accommodation region AR shown in broken outline; it will be apparent that region AR is longer in direction F than it would be if the two seats in front were in register with each other. Nevertheless, in some embodiments (not illustrated) the seats in each row may be in register with each other in the forward direction F.

In illustrated embodiments, the forward direction F is obliquely disposed to the longitudinal direction L of the cabin 12. For example, the forward direction F may be at an angle θ2 of between 17° and 24° (inclusive) to the longitudinal direction L. although smaller or larger angles may be implemented depending on the requirements of the application. In the illustrated embodiment, the forward direction F extends obliquely towards the outer boundary of the cabin 12, which is the side of the fuselage 10 (or other vehicle body structure). In alternative embodiments, the forward direction F may be parallel with the longitudinal direction L, or may extend towards the centre of the cabin 12 or towards an aisle.

In illustrated embodiments, the rows extend perpendicularly to the longitudinal direction L. In alternative embodiments, the rows may extend obliquely to the longitudinal direction L.

In the illustrated embodiment, the first and second instances of the seating arrangement 14A, 14B are located on opposite sides of the aisle 15, and the respective forward direction F of the seating arrangements 14A, 14B extends obliquely away from the aisle 15 and away from each other.

More generally, the cabin 12 may be a single aisle 15 cabin, or a multi-aisle cabin in which one or more seating arrangements embodying the invention may be located between any aisle and the fuselage, or other vehicle body structure, or between any two aisles, and may be oriented such that their respective forward direction F extends obliquely away from or towards an aisle, or away from or towards an outer boundary such as the fuselage, and/or forwardly or rearward with respect to the aircraft or other vehicle. Different instances of the seating arrangement may be oriented in different directions within the same cabin. The actual orientation and arrangement of the seating arrangement(s) in any given cabin may depend on the size of the cabin and/or on the requirements of the aircraft operator.

While FIG. 1 shows four rows in each seating arrangement 14A, 14B, it will be understood that there may be more or fewer rows as required by the application. In preferred embodiments, each row runs in a transverse direction that is perpendicular to the longitudinal direction L of the cabin 12. In alternative embodiments, the rows may run obliquely to the longitudinal direction.

The seating arrangement 14A, 14B comprises at least one instance of, but typically a plurality of instances of, a first seat 16A and a second seat 16B arranged as is now described. The first seat 16A is spaced apart from the second seat 16B in the forward direction F. In typical embodiments therefore the first seat 16A is located in the row in front of the row in which the second seat 16B is located. The first and second seats 16A, 16B are, with respect to each other, offset but preferably overlapping in a transverse direction T that is perpendicular to the forward direction F. The seats 16A, 16B may therefore be the to be staggered in the transverse direction T, i.e. they are not aligned or in register with each other in the transverse direction T. Preferably, the first and second seats 16A, 16B overlap in the transverse direction T. This overlap (which is shown as O in FIG. 1) increases the number of seats that can be located in a given area. By way of example, the transverse overlap O may be up to 10 inches (or 254 mm) (and is 4.9 inches (or 124.46 mm) in the illustrated embodiment), although a larger overlap O may be provided depending on the requirements of the application. In some embodiments, there is no transverse overlap O between the first and second seats 16A, 16B, although they are still advantageously offset with respect to each other in the transverse direction T.

More generally, the seats 16 in any one row are offset, i.e. not aligned, in the transverse direction T with respect to the seats 16 in the row in front and/or behind, as applicable. There may or may not be an overlap in the transverse direction T between a given seat 16 in any one row and the, or each, closest seat 16 in the row in front and/or behind, i.e. to the right and to the left of the given seat 16. Considering rows R1 and R2 of FIG. 1 as an example, a third seat 16C is adjacent and in the same row R1 as the first seat 16A, and is in front of the second seat 16B which is in the row R2 behind. The first and third seats 16A, 16C are the closest seats in row R1 to seat 16B, i.e. are to the left and right of seat 16B respectively. Because of the transverse offset, the second seat 16B is located between the first and third seats 16A, 16C in the transverse direction. As described above, the second seat 16B and first seat 16A may or may not overlap in the transverse direction T. Optionally, the second seat 16B overlaps in the transverse direction T with the third seat 16C. The amount of the transverse overlap between the second and third seats 16B, 16C may vary from application to application depending on a number of factors including seat width, whether or not a console 50 is provided between adjacent seats and, if so, the width of the console 50, The preferred arrangement is such that the accommodation region AR is wide enough to accommodate both legs of a passenger in the second seat 16C. Typically, the seat pan of the second seat 16B overlaps in the transverse direction T with the seat pan of the third seat 16C. Typically, the second seat 16B overlaps with the third seat 16C in the transverse direction by an amount that is more than the amount of its transverse overlap (if there is any) with the first seat 16A. It will be understood that in any seating arrangement embodying the invention there may be multiple instances of first, second and third seats 16A, 16B, 16C as described above. The combined effect of the transverse offset of the seats 16A, 16B, 16C together with the forward offset of the seats in a row provides seated passengers with a larger passenger accommodation region AR than is provided by conventional seating arrangements.

As illustrated, the transverse overlap O may refer to the transverse overlap of the respective seat pans, but may refer more generally to the seat as a whole, including the armrests. For example, in some embodiments there may be no transverse overlap of the respective seat pans, but there may be a transverse overlap between the respective armrests of the first and second seats 16A, 16B, or a transverse overlap between the armrest of one seat 16A, 16B and the seat pan of the other seat 16B, 16A or vice versa. The transverse overlap O creates an overlap of the respective passenger accommodation regions AR provided by the seats 16A, 16A, as indicated by ARO in FIG. 1.

In illustrated embodiments, any row that is in front of another row has at least one first seat 16A, and the row behind has the corresponding second seat 16B. Each seat 16 of any given row may serve as a first seat 16A for a corresponding second seat 16B in the row behind, and/or as a second seat 16B for a corresponding first seat 16A in the row in front. Whether or not a given seat 16 serves as a first seat 16A and/or a second seat 16B depends on whether or not there is a row in front or a row behind, and on the number of seats in each row.

Advantageously, corresponding first and second seats 16A, 16B are spaced apart in the forward direction F by a distance, or pitch P, that allows part of at least one leg of a passenger in the second seat 16B to fit below an overhang provided at the rear of the first seat 16A when the second seat 16B is in the reclined state. The transverse offset between the first and second seats 16A, 16B is preferably such that only one leg of the passenger fits below the overhang. The pitch P is the pitch between adjacent rows of the seating arrangement 14A, 14B, and may be defined as the distance between a point on a seat in one row and a corresponding point on a seat in an adjacent row in the forward direction. In preferred embodiments the pitch P is 33 inches or longer depending on the requirements of the application. Shorter pitches may be used depending on the requirements of the application.

In illustrated embodiments, the first seat 16A and corresponding second seat 16B do not overlap in the forward direction F, at least when they are in the upright state, but preferably also when either or both of the seats 16A, 16B are in the reclined state. The preferred configuration is such that there is a shortest distance of at least one inch between the leg rest 22 of the second seat 16B when in the reclined state and the rear of the corresponding first seat. For example, the shortest distance may be 1 inch, or approximately 1 inch.

Referring now in particular to FIGS. 2 to 5, the preferred seat 16 is described. The seat 16 comprises a seat pan 18, a back rest 20 and a leg rest 22. Optionally, the leg rest 22 may be omitted. The seat 16 is operable between an upright state (see in particular FIG. 4A) and a reclined state (see in particular FIG. 4B). In the reclined state the seat pan 18 is in a position that is forward (in the direction F) with respect to a position of the seat pan 18 in the upright state. The amount by which the seat pan 20 moves forward when the seat 16 is operated from the upright state to the reclined state may be selected depending on one or more other characteristics of the seating arrangement 14A, 14B, e.g. the pitch P, and may for example be between 6 inches and 20 inches.

The seat pan 18 preferably also moves generally downwards when the seat 16 moves from the upright state to the reclined state, and generally upwards when the seat 16 moves from the reclined state to the upright state. The preferred arrangements is such that, in the reclined state, a rear portion 18B of the seat pan 18 is at a level that is lower than a level of the rear portion 18B in the upright state. When the seat 16 is installed in an aircraft or other vehicle, the level may be measured as the vertical height or distance above the floor of the cabin 12.

In illustrated embodiments, when the seat 16 is in the reclined state a front portion 18A of the seat pan 18 is at a level that is the same or substantially the same as a level of the front portion 18A when the seat 16 is in the upright state. In alternative embodiments, the arrangement may be such that the reclined state level of the front portion 18A is lower than the upright state level. Further alternative embodiments may have the reclined state level of the front portion 18A higher than the upright state level but this is not preferred. The height of the front edge of the seat pan 20 above the floor may be selected to suit the application.

In illustrated embodiments, when the seat 16 is in the reclined state the seat pan 18 is disposed more steeply (in the rear-to-front direction of the seat pan 18) with respect to horizontal than it is when in the upright state. In particular in the reclined state the seat pan 18 is inclined with respect to horizontal at an (acute) angle that is greater than the (acute) angle at which the seat pan 18 is inclined with respect to horizontal in the upright state. In this context it is assumed that the angle of inclination is measured in a vertical plane that is parallel with the forward direction F, and is measured from the forward direction F, i.e. such that the forward direction F may be designated as 0°.

For example, the illustrated upright state seat pan angle 6.5°, although the angle may be chosen to suit the application, typically being between 0° and 15° (inclusive). The preferred reclined state seat pan angle is 24°, although it may be smaller or larger depending on the requirements of the application.

The angle of inclination of the seat pan 18 and the heights of the front 18A and rear 18B of the seat pan 18 are inter-related. In preferred embodiments, a desired angle of inclination is selected for passenger comfort, which in turn determines the lower reclined state level of the rear 18B of the seat, depending on whether it is desired to have the front portion 18A at the same or a lower level than the upright state level. When the seat 16 is installed in an aircraft or other vehicle, horizontal may be taken as being parallel with the floor of the cabin.

In illustrated embodiments, when the seat 16 is in the reclined state the back rest 20 is in a position that is lower with respect to the position of the back rest 20 when the seat 16 is in the upright state. In particular, in the reclined state a bottom portion 20A of the back rest 20 is at a level that is lower than the level of the bottom portion 20A in the upright state. Typically, in the reclined state a top portion 20B of the back rest 20 is in a position that is rearward with respect to the position of the top portion 20B in the upright state. Preferably, in the reclined state the bottom portion 20A of the back rest 20 is in a position that is forward with respect to the position of the bottom portion 20A in the upright state.

In illustrated embodiments, when the seat 16 is in the reclined state, the back rest 20 is more shallowly disposed, i.e. more reclined, than it is when the seat is in the upright state. In particular, in the reclined state the back rest 20 is inclined with respect to horizontal at an (obtuse) angle that is more than the (obtuse) angle at which the back rest 20 is inclined with respect to horizontal in the upright state. Preferably, the angle between the seat pan 18 and back rest 20 is 94° in the upright state, although it may be smaller or larger depending on the requirements of the application. In the reclined state, the illustrated angle between the seat pan 18 and back rest 20 is 105°, although it may be smaller or larger depending on the requirements of the application, typically being between 100° and 120° (inclusive).

In illustrated embodiments, the downward and forward movement of the back rest 20 matches the downward and forward movement of the seat pan 18. Typically, the back rest 20 and the seat pan 18 are pivotably coupled together and as such may move together between the inclined and upright states, although the coupling may be configured such that independent movement of the back rest and the seat pan is supported. Conveniently, the bottom portion 20A of the back rest 20 is pivotably coupled to the rear portion 18B of the seat pan 18. Any conventional coupling mechanism(s) may be used to couple the seat pan 18 and back rest 20 together.

In illustrated embodiments, when the seat 16 is in the reclined state, the leg rest 22 is less steeply inclined with respect to horizontal than it is when the seat 16 is in the upright state. In particular, in the reclined state the leg rest 22 is inclined with respect to horizontal at an (acute) angle that is less than the (acute) angle at which the leg rest 22 is inclined with respect to horizontal in the upright state. Typically, the leg rest 22 and the seat pan 18 are pivotably coupled together and as such may move together between the inclined and upright states, although the coupling may be configured such that independent movement of the leg rest 22 and the seat pan 18 is supported. Conveniently, a top, or rear, portion of the leg rest 22 is pivotably coupled to the front portion 18A of the seat pan 18. Any conventional coupling mechanism(s) may be used to couple the seat pan 18 and leg rest 22 together. In some embodiments, the leg rest 22 is omitted.

Optionally, the leg rest 22 and the back rest 20 are parallely, or substantially parallely, disposed with each other when the seat 16 is in the reclined state. In the reclined state, the seat pan 18 and the back rest 20 are obliquely disposed with respect to each other. As such, the seat 16 does not recline into a bed, i.e. it does not have a flat or substantially flat, sleeping surface in the reclined state. The leg rest 22 may be substantially vertically disposed in the upright state.

The seat 16 includes a base structure 30, which may take any suitable conventional form. In use, the base structure 30 is fixed to the floor of the cabin 12 and supports the seat 16. Each seat 16 may have its own base structure 30, or at least part of the base structure 30 may be shared by more than one seat 16. Commonly, multiple seats, e.g. the seats of a given row, share part(s) (e.g. transverse supports (not shown) of the same base structure 30 while other respective part(s) (e.g. leg 31) are dedicated to each seat 16. The seat 16 may be mounted to the base structure 30 may any conventional means. Also provided are means for articulating the seat 16 with respect to the base structure 30 between the upright and inclined states. Typically, at least the seat pan 18 is articulated with respect to the base structure 30, since either one or both of the back rest 20 and leg rest 22 may be articulated to the seat pan 18. The articulating means may take any conventional form, typically comprising one or more coupling mechanism, linkage and/or other mechanism configured to allow at least the seat pan to move with respect to the base structure between the upright and reclined states. The articulating means may include means for articulating the back rest 20 and/or the leg rest 22 with respect to the base structure 30.

Alternatively or in addition, the seat 16 may include means for articulating the back rest 20 with respect to the seat pan 18 and/or means for articulating the leg rest 22 with respect to the seat pan 18. The articulating means may take any conventional form, typically comprising one or more coupling mechanism, linkage and/or other mechanism configured to allow the back rest or the leg rest to move with respect to the seat pan between the upright and reclined states.

Typically, actuation means (not shown), typically comprising one or more motor and/or one or more actuator, for example gas strut(s) or electric actuator(s) (not shown), are provided for actuating seat parts relative to each other and/or relative to the base structure. The actuation means may take any suitable conventional configuration.

Optionally, the seat 16 is provided a shroud or shell structure 32. The shell structure 32 may be part of the base structure 30 (even though it may be provided separately from other components of the base structure 30 such as the legs 31 and transverse supports) and as such the seat 16 may be mounted, coupled and/or articulated to the shell structure 32 as required to facilitate movement between the upright and reclined states. The shell structure 32 may take any convenient form, typically comprising one or more structures that surround at least part of the seat 16, typically at least the back of the seat 32, and optionally the or each side of the seat 16.

The shell structure 32 has a back portion 34 located behind the respective back rest 20. The back rest 20 is movable with respect to the back portion 34 to facilitate movement of the seat 16 between the upright and inclined states. Optionally, the back rest 20 may be coupled to the back portion 34 by a guide mechanism (not shown), e.g. a slide or pin-and-track mechanism, configured to facilitate movement of the back rest 20 between the upright and reclined states. The back portion 34 includes an upper back portion 34B above a lower back portion 34A. The upper back portion 34B projects rearwardly of the lower back portion 34A so that a rear surface 36 of the back portion 34 is shaped to define an overhang 38. The overhang 38 extends transversely across the rear surface 36. As a result, the rear surface 36 of the lower back portion 34A is recessed with respect to the rear surface 36 of the upper back portion 34B.

The upper back portion 34B is shaped to define a recess 40 for receiving the top portion 20B of the back rest 20 when the seat 16 is in the reclined state. The recess 40 projects rearwardly of the lower back portion 34A to provide the overhang 38. More particularly, the recess 40 includes a portion 42 that extends rearwardly from the lower back portion 34A at the interface between the lower and upper back portions 34A, 34B, causing a corresponding step in the back surface 36 of the shell 32 that forms the overhang 38. The portion 42 is preferably configured to serve as a seat for the top portion 20B of the back rest 20 (as shown in FIG. 4B) when the seat 16 is in the reclined state. Accordingly, the portion 42 (or at least a surface of the portion 42) of the recess 40 is preferably inclined at an angle that matches the angle of inclination of the back rest 20 when reclined, or is otherwise configured to provide a seating surface in the recess 40 for the back rest.

Figure 5:
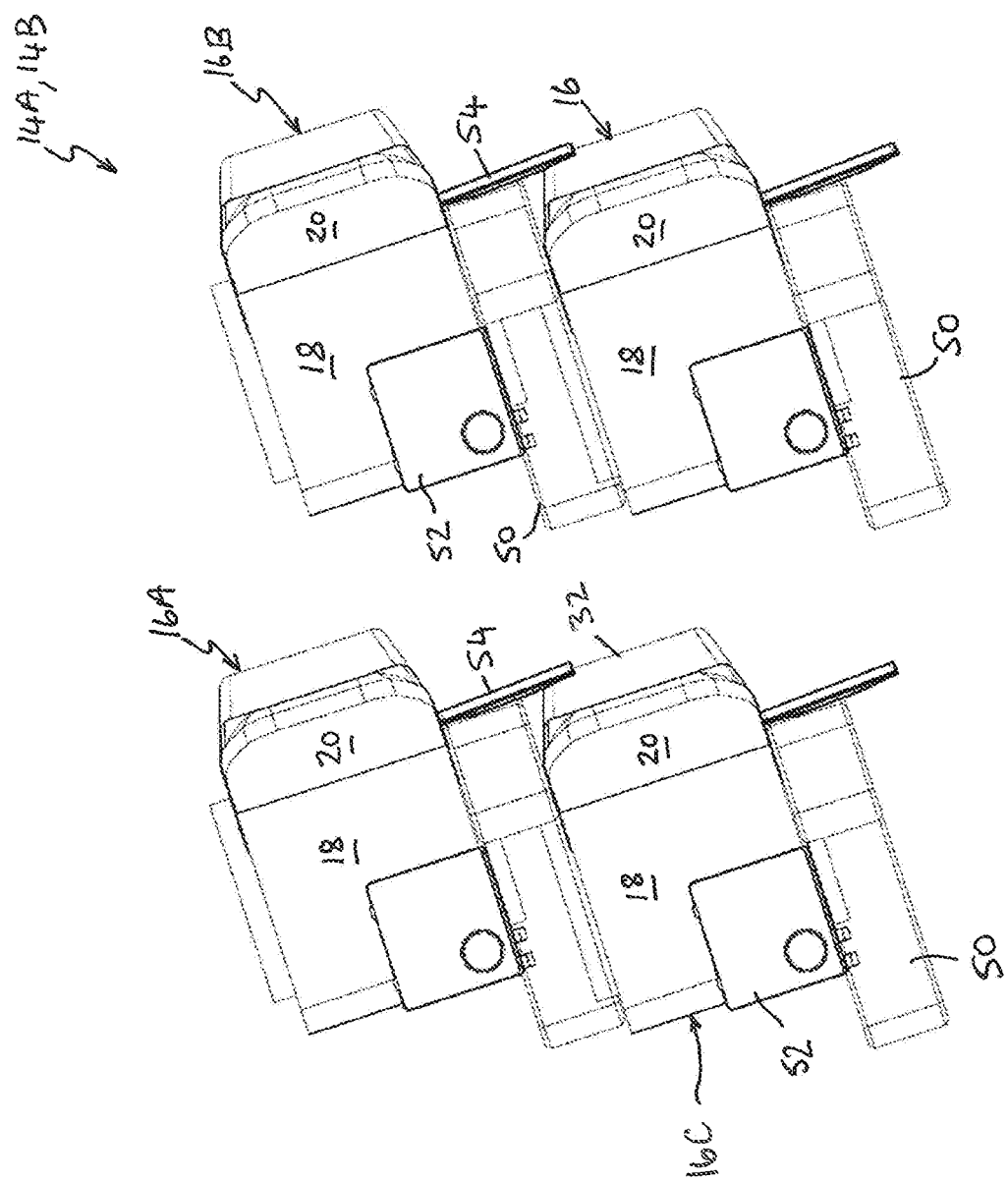
FIG. 5 is a plan view of the two rows of FIG. 3 showing trays and electronic display devices.

As can be seen from FIGS. 1 and 5 in particular, the seat pan 18 of the first seat 16A is offset but overlapping with the seat pan 18 of the second seat 16B in the transverse direction T. Preferably, the back rest 20 of the first seat 16A is overlapping but offset with the leg rest 22 of the second seat 16B in the transverse direction T. As described above, in some embodiments there is no overlap of the seats 16A, 16B in the transverse direction T, although they are still offset, i.e. not aligned, in the transverse direction.

In some embodiments, particularly in which the first and second seats 16A, 16B are offset but overlap in the transverse direction T, the first and second seats 16A, 16B are spaced apart in the forward direction F by a pitch P that allows part of at least one leg of a passenger (not shown) in the corresponding second seat 16B to fit below the overhang 38 in the rear of the first seat 16A when the second seat 16B is in the reclined state. It is further preferred that the transverse offset between the first and second seat 16A, 16B is such that only one leg of the passenger fits below the overhang 38. Whether the first and second seats 16A, 16B overlap or not in the transverse direction T, the overhang 38 provided by the first seat 16A facilitates access to the second seat 16B for a passenger, for example from an aisle, particularly in cases where the pitch P is relatively small. As such, the overhang 38 facilitates the provision of seating arrangements 14A, 14B with a smaller inter-row pitch P than can otherwise be obtained. Moreover, the overhang 38 provided by the third seat 16C increases the size of the accommodation region AR for the second seat 16B in comparison with embodiments in which there is no overhang.

Typically, a foot well region 39 is provided at the rear of each seat 16 for accommodating the feet of a passenger seated in a rearwardly located seat 16. In particular, the foot well 39 of the third seat 16C can accommodate the feet of a passenger in the second seat 16B, especially when seat 16B is reclined. In addition, the foot well 39 of the first seat 16A can accommodate the feet of a passenger in the second seat 16B, especially when the first and second seats 16A, 16B overlap in the transverse direction. The foot well region 39 is at ground level and recessed with respect to the higher portions of the rear of the seat 16. In embodiments with the shell 32, the back portion 34 may be shaped to define a foot well portion 34C that is recessed with respect to the lower back portion 34A to provide the foot well region 39. In preferred embodiments in which the seat pan 18 lowers and moves forward as described above, the foot well region 39 is below the seat pan 18 when the seat 16 is upright, and is below the bottom of the back rest 20 when the seat is reclined.

In alternative embodiments (not illustrated) in which there is no shell around the seats, an overhang region is provided at the rear of the back rest 20, the location of which depends on the state of the back rest 20, as can be appreciated from FIG. 4A with the upright back rest 20 and FIG. 4B with the reclined back rest 20. A foot well region is also provided. In preferred embodiments in which the seat pan 18 lowers and moves forward as described above, the foot well region is below the seat pan 18 when the seat 16 is upright, and is below the bottom of the back rest 20 when the seat is reclined.

In illustrated embodiments, a console 50 is provided adjacent each seat 16. A deployable table 52 may be provided in the console 50. The shell structure 32 preferably carries a rearward facing electronic display device 54. The display device 54 may extend laterally from the shell structure in the transverse direction T when deployed. The illustrated arrangement is such that the display device 54 provided on the first seat 16A is positioned for use by a passenger in the corresponding second seat 16.

In illustrated embodiments, the combined effect of the transverse offset of the seats 16A, 16B, 16C in adjacent rows, together with the forward offset of the seats 16 in any given row provides seated passengers with a larger passenger accommodation region AR than is provided by conventional seating arrangements. The accommodation region AR of the second seat 16 is advantageously increased by the provision of the overhang of the third seat 16C, and preferably also by the recessed foot well region 39. The overhang of the first seat 16A may also increase the space available to access a rearward second seat 16B, which allows relatively small inter-row pitches P to be implemented, and can also provide room to accommodate a passenger's leg, thereby facilitating the first and second seats 16A, 16B being overlapped in the transverse direction if the spatial demands of the application require it. Furthermore, the lowering of the seat pan when the seat 16 is reclined not only adds to the passenger's comfort but also makes more efficient use of the accommodation region AR available to the passenger, allowing the passenger to fit more comfortably into the accommodation region AR, which in turn makes relatively small inter-row pitches P practical.

The invention is not limited to the embodiment(s) described herein but can be amended or modified without departing from the scope of the present invention, which is intended to be limited only by the scope of the appended claims as interpreted according to the principles of patent law including the doctrine of equivalents.

The invention claimed is:

1. A seating arrangement for a passenger-carrying vehicle, said seating arrangement comprising:
    a first seat and a third seat arranged in a first row adjacent each other and facing in a forward direction; and
    a second seat located rearwardly of said first and third seats;
    wherein said third seat is offset forwardly with respect to said first seat, and wherein said second seat is offset with respect to each of said first and third seats in a transverse direction that is perpendicular to the forward direction such that it is located between said first and third seats in the transverse direction, and wherein said first and second seats are, with respect to each other, overlapping in the transverse direction; and
    wherein each of said seats comprises a seat pan and a back rest, and is operable between an upright state and a reclined state, wherein in the reclined state said seat pan is in a position that is forward with respect to a position of said seat pan in the upright state, and a rear portion of said seat pan in the reclined state is at a level that is lower than a level of said rear portion of said seat pan in the upright state, and wherein an overhang is provided at a rear of each seat; and
    wherein said first and second seats are spaced apart in the forward direction by a pitch dimensioned to allow at least part of at least one leg of a passenger in said second seat to fit below said overhang at the rear of said first seat when said second seat is in the reclined state, and wherein a transverse overlap between said first and second seats in the transverse direction is dimensioned such that only one leg of the passenger fits below said overhang.

2. The seating arrangement of claim 1, wherein said second and third seats are, with respect to each other, overlapping in the transverse direction, and wherein said seat pan of said second seat is offset but overlapping with said seat pan of said third seat in the transverse direction and/or said back rest of said third seat is offset but overlapping with a leg rest of said second seat in the transverse direction.

3. The seating arrangement of claim 1, wherein said seat pan of said first seat is offset but overlapping with said seat pan of said second seat in the transverse direction and/or said back rest of said first seat is offset but overlapping with a leg rest of said second seat in the transverse direction.

4. The seating arrangement of claim 1, wherein said first seat and said third seat overlap with each other in the forward direction.

5. The seating arrangement of claim 1, wherein said first seat and said second seat do not overlap in the forward direction when said first and second seats are in the upright state, and when either or both of said seats are in the reclined state.

6. The seating arrangement of claim 1, wherein in the reclined state a front portion of said seat pan is at a level that is the same or substantially the same as a level of said front portion in the upright state.

7. The seating arrangement of claim 1, wherein in the reclined state said seat pan is more steeply disposed with respect to horizontal than it is when said seat is in the upright state.

8. The seating arrangement of claim 1, wherein in the reclined state a bottom portion of said back rest is at a level that is lower than a level of said bottom portion in the upright state, and/or wherein in the reclined state said back rest is in a position that is lower with respect to a position of said back rest in the upright state.

9. The seating arrangement of claim 1, wherein in the reclined state a bottom portion of said back rest is in a position that is forward with respect to a position of said bottom portion in the upright state, and/or wherein in the reclined state a top portion of said back rest is in a position that is rearward with respect to a position of said top portion in the upright state.

10. The seating arrangement of claim 1, wherein said seat includes a leg rest and wherein, in the reclined state said leg rest is less steeply inclined with respect to horizontal than it is the upright state.

11. The seating arrangement of claim 1, wherein in the reclined state said seat pan and said back rest are obliquely disposed with respect to each other, and wherein said leg rest is disposed parallel, or substantially parallel with respect to said back rest.

12. The seating arrangement of claim 1, further including a base structure and an articulating mechanism for articulating at least said seat pan with respect to said base structure to enable movement of said seat between the upright and reclined states, wherein said articulating mechanism comprises one or more chosen from a coupling mechanism, a linkage, or another mechanism configured to allow at least said seat pan to move with respect to said base structure between the upright and reclined states, and wherein said articulating mechanism is operable to articulate said back rest and/or a leg rest with respect to said base structure.

13. The seating arrangement of claim 1, further including a back rest articulating mechanism for articulating said back rest with respect to said seat pan and/or a leg rest articulating mechanism for articulating a leg rest with respect to said seat pan, wherein said articulating mechanism or mechanisms comprise one or more chosen from a coupling mechanism, a linkage, or another mechanism configured to allow said back rest and said leg rest to move with respect to said seat pan between the upright and reclined states.

14. The seating arrangement of claim 1, said seat being provided in a shell structure, said shell structure having a back portion located behind the respective back rest, said back rest being movable with respect to said back portion, and wherein said back portion includes an upper back portion above a lower back portion, said upper back portion projecting rearwardly of said lower back portion so that a rear surface of said back portion is shaped to define an overhang, and wherein said upper back portion is shaped to define a recess for receiving said top portion of said back rest when said seat is in the reclined state, said recess extending rearwardly of said lower back portion to provide said overhang, and wherein said recess includes a portion for seating said top portion of said back rest when said seat is in the reclined state, said seating portion forming said overhang.

15. A passenger-carrying vehicle comprising the seating arrangement of claim 1.

16. The vehicle of claim 15, wherein first and second instances of said seating arrangement are located on opposite sides of an aisle, and wherein the respective forward direction of each of said first and second instance extends obliquely away from or obliquely towards the aisle.

* * * * *